Dec. 10, 1968  J. SCHMITT  3,415,034
BOTTLE CAPPING MACHINE
Filed July 14, 1965  3 Sheets-Sheet 1

Dec. 10, 1968 J. SCHMITT 3,415,034
BOTTLE CAPPING MACHINE
Filed July 14, 1965 3 Sheets-Sheet 2

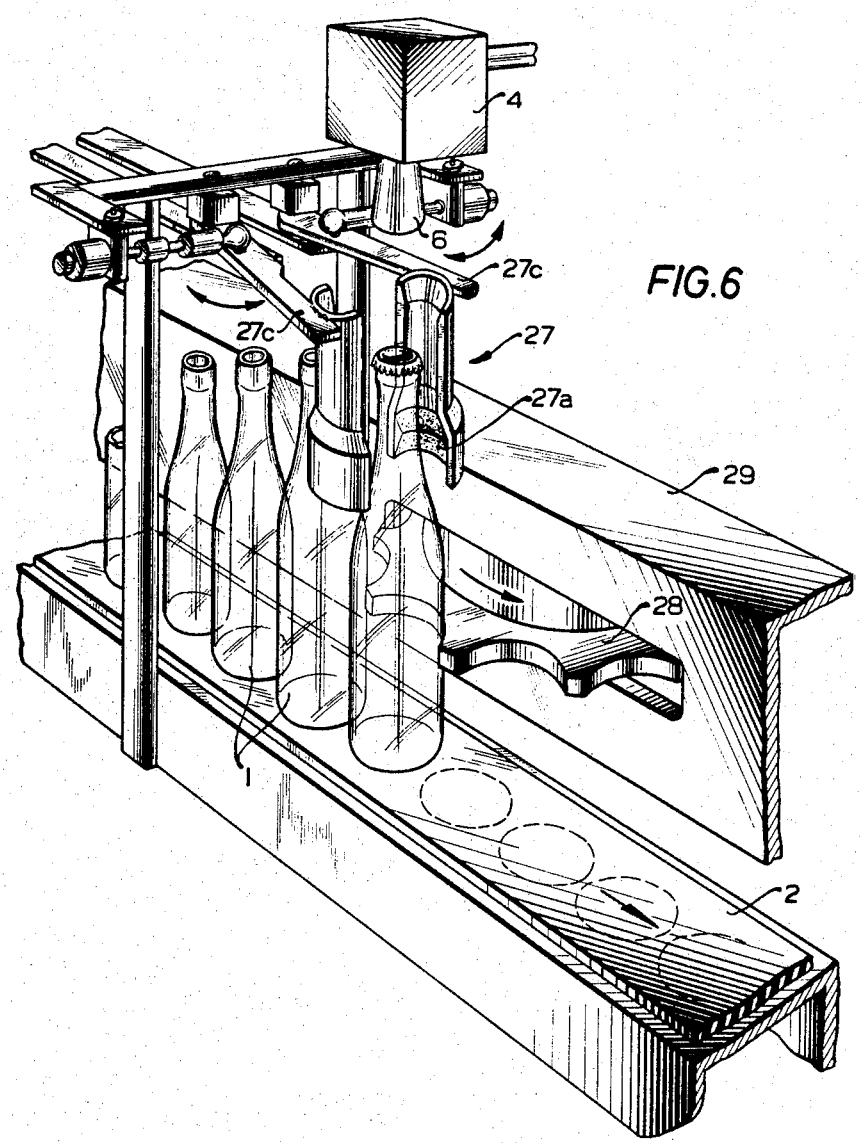

United States Patent Office 3,415,034
Patented Dec. 10, 1968

3,415,034
BOTTLE CAPPING MACHINE
Johann Schmitt, Nierstein, Germany, assignor to Vereinigte Kapselfabriken Nackenheim GmbH, Nackenheim (Rhine), Germany
Filed July 14, 1965, Ser. No. 471,982
Claims priority, application Germany, July 23, 1964, V 26,419; Jan. 8, 1965, V 27,511
11 Claims. (Cl. 53—128)

The present invention relates to bottle capping machines, to caps used for the protection or for the closing of bottles and openings of various containers, and to methods of separating and conveying caps from an assembly of caps put together for purposes of transportation.

Bottle capping machines are known which make it possible to provide bottles automatically with decorative caps with the aid of mechanical or pneumatic means. In such known apparatus it is necessary to stop the bottles, which are usually conveyed on a conveyor belt, at a predetermined place without stopping the belt. This can be done in a manner known per se, for example, by the use of star wheels having teeth which project guide strips and which retain or release the bottles on the uniformly traveling conveyor belts, depending on whether the wheels stop or move. Worm conveyors are also used and operate analogously, the bottles conveyed by the conveyor belt being taken up by the threads of the worm and positively guided.

It is a disadvantage in known arrangements that the bottles are often not accurately centered at the capping station where the caps are put on, since they are never in a state of rest because of the conveyor belt which continues to move under them. For this reason, dependable mounting of the caps is not always assured. This can be remedied, according to the invention, by the provision of at least one centering clamp or holding device which is adjacent a transporting cup or holder, and which can be operated synchronously with the capping process.

Further, known caps are either wound from thin foil material, or are drawn from a plate, or are extruded from metal or plastic. In each case, the jacket member of the cap is sensitive and unstable. In order to avoid damage and to save space during transport, the caps are put on top of each other, packed in the form of bars, and shipped in this manner. It is inevitable that the cap bars are jolted by shocks during transportation. This often causes the unstable conical cap jackets to stick together so firmly due to suction that it is difficult, if not impossible, to separate the cap bars mechanically at the place of processing. Frequently, the cap bars have to be separated manually, which means an extremely undesirable expenditure of labor.

Many efforts have been made and many methods have been tried to insert the caps into each other in such a manner that a jamming of the individual caps in the cap bar is avoided, in order to make it possible to lift off the caps easily and quickly when they are being separated. To this end, for example, each individual cap of the bar has been enveloped with wax paper, or rounded edges, corrugations, cams or flanges have been stamped into the cap jacket, or spaces, for example, in the form of cork discs, were inserted between the individual cap bottoms. The known use of layers of paper or cork have the great disadvantage that they foul the cap applying apparatus and obstruct their functioning, when the caps are mechanically applied ot the bottle or other such articles. The rounded cams, edges or other stamped forms used for spacing deform in the unstable cap jacket and their jamming impairs their usefulness and renders them more useless than useful.

It has now been found that the above-described disadvantages can be eliminated, in a cup-shaped, conical cap of drawn, wound, extruded, die-cast, or ejection-molded metal or plastic having one or more stampings arranged underneath the cap bottom, in a surprisingly simple and perfect manner, in accordance with the invention, in that the stampings are open toward the cap edge and form with an inwardly curved face sharply bounded supporting or bearing surfaces for the bottom of the next successive cap which follows in a cap bar.

When caps developed in this way are nested, the bottom of the following cap is supported by the sharp edge of the preceding cap. Said sharp edge cannot be impaired in its supporting function, even when subjected to substantial stress and strain during transportation. Consequently, a wedging of the caps is prevented. In addition, air is able to enter freely, through the open stampings, into the space between the bottoms of succeeding caps, thereby avoiding the formation of vacuum spaces between the caps during the separation of the latter, said vacuum spaces previously having impeded the detaching of the respective caps. As a result thereof, the cap bars of the invention can be separated without difficulty.

Another advantage of the stampings developed according to the invention in the cap jacket, resides in that the caps are kept at a mutual distance accurately determined by the position of the sharp edge with respect to the cap bottom and that, accordingly, the open cap edge of a cap of the stack is spaced by a precise amount from the cap edge of the following cap in the stack. This makes it possible to grip, during the separation, the cap edge of the cap succeeding the foremost cap, whereas said edge can frequently hardly be seen, let alone be gripped, in bars composed of known caps.

According to a further development of the invention, caps according to the invention can be expediently separated in that the foremost cap, held by a holding ring at the open edge of the cap jacket, of a cap bar located in a groove is embraced around its head portion in a transporting cup, and is removed from the cap bar while overcoming the holding resistance of the holding ring, and is moved to a processing station for subsequent treatment where it is released, while the holding ring retains the following cap at the open end of the cap jacket.

The clamping or gripping elements of the transporting cup and of the holding ring may be expediently developed as pneumatically actuated membranes or diaphragms.

After the clamping elements of the transporting cup have been released, the cap can be efficiently mounted. The cap is mounted at the processing station on a work pin or on a contained to be capped, for example, on a bottle, and can be firmly pressed on by a suitable device. This has the advantage that caps with a very steep conical form can be cleanly and firmly mounted on bottles and can subsequently be fixed on a bottle with perfect results.

Other features, advantages and possibilities of using the invention will become apparent from embodiments described in the following description with reference to the accompanying drawing, in which:

FIGURE 6 is a perspective view of the centering arrangement of the invention.

Figure 1:
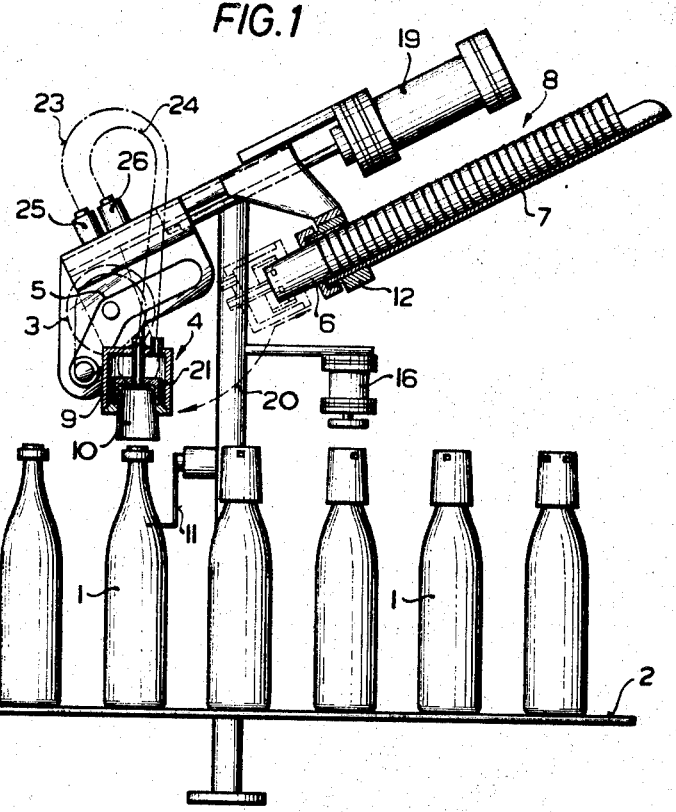
FIGURE 1 is a diagrammatic view of an apparatus for separating and mounting caps on bottles.

The apparatus according to FIG. 1 comprises a conveyor belt 2, on which the bottles 1, in upright position, are guided past the separating and conveying device 3. The device 3 is provided with conveying or transporting cup 4 and an inclined cap supply groove or gutter 7.

The conveying cup 4 is displaceable and pivotable along a coulisse guide 5 by means of a piston-cylinder arrangement 19, in order to grip the foremost cap 6 of a cap bar 8 positioned on the groove or gutter 7 and to deliver this cap at the station 10 directly above a bottle 1 standing upright on the conveyor belt 2. The arrow 20 indicates the path of motion of the conveying cup 4.

Figure 1A:
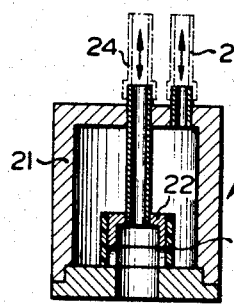
FIGURE 1a is a partial and sectional view according to FIG. 1 on an enlarged scale.

The conveying cup 4 (FIG. 1a) comprises a housing 21 and a gripper head 22, which is adapted to the shape of the cap and is mounted in the housing, is provided with annular slots in its jacket and is embraced by a flexible diaphragm or membrane 9 covering the slots.

The housing 21 and the bottom of the gripper head 22 are connected to compressed-air connections 25 and 26 (FIG. 1) by way of flexible pipes 23 and 24. The supply of compressed air is controlled by means of a switch 11 actuated by the bottles 1. A holding ring 12 arranged at the lower end of the groove or gutter 7 embraces the cap bar 8 and yieldingly engages the marginal portion of the foremost cap 6.

Figure 2:
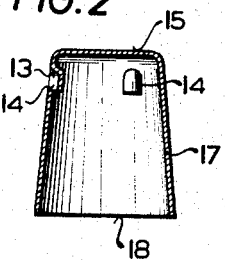
FIGURE 2 is a cross-sectional view of a cap developed according to the invention.
Figure 3:
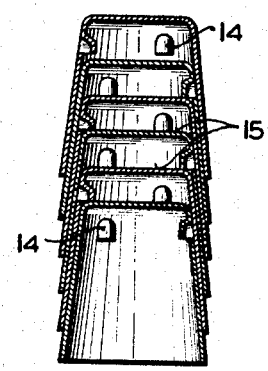
FIGURE 3 is a cross-sectional view of a cap bar composed of a plurality of caps according to FIG. 2.

The cup-shaped conical bottle cap illustrated in FIG. 2 comprises, under the bottom 15 in the frusto-conical cap jacket 17, three stampings or indentations 13 which are pressed inwardly from the cap jacket and are open toward the free cap edge 18. In this manner, the stampings 13 form inwardly curved faces 14 which serve as sharply bounded supporting surfaces for the bottom 15 of the next successive cap in the cap bar, as illustrated in FIG. 3.

Figure 4:
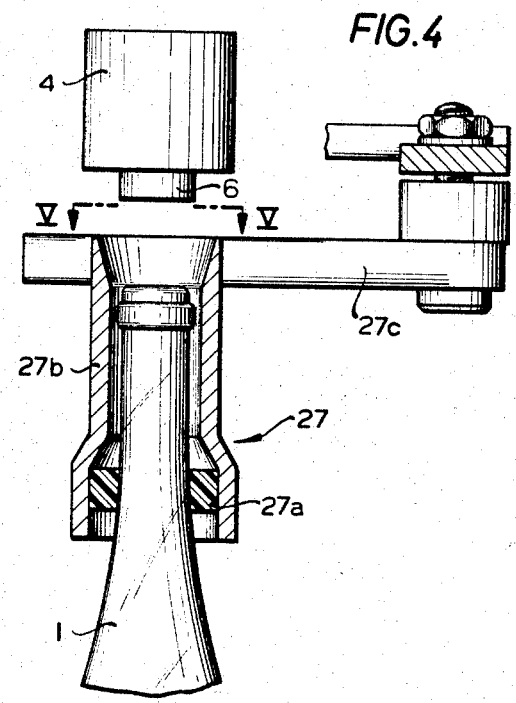
FIGURE 4 shows the basic arrangement of a centering clamp according to the invention.

In FIG. 4, which shows a bottle 1, part 27 is a centering clamp and part 4 is the conveying cup. The centering clamp embraces the neck of the bottle with the aid of a semi-annular holding element 27a, which is preferably made of elastic material. The bottle mouth is thereby accurately centered below the conveying cup 4.

In order to mount the cap 6 effectively on the bottle, the centering clamp comprises a cap-guiding member 27b. The latter may have the shape of a closed funnel or may be developed in rib-like manner. The cap-guiding member makes it possible to provide bottles of different height—as, for example, in the case of return bottles (i.e., bottles which are returned by the consumer)—with caps without any trouble. The centering clamp can be pivoted and thereby opened and closed by means of an arm 27c.

Figure 5:
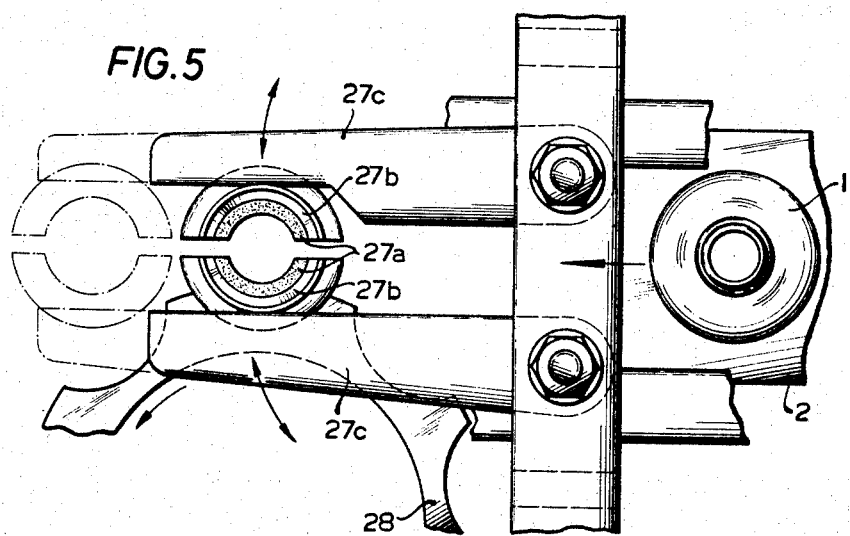
FIGURE 5 is a view in direction A of FIG. 4.

The members in FIG. 5 which have been shown in FIG. 4 are provided with the same reference numerals. FIG. 5 shows that the centering clamp is composed of mutually pivotable elements of partly cylindrical shape. In addition, a double centering clamp is arranged.

According to FIG. 6, return bottles 1 of different heights are moved by means of conveyor belt 2. A sorting gear 28, which grips with its teeth surfaces between a bottle guiding rail 29, is rotated without special drive, by the bottles which accumulate ("dam up") ahead of the gear and which are fed to the centering clamp at a predetermined distance.

The bottle capping machine operates in the following manner:

The conveying cup 4 (FIG. 1) is pivoted, by means of the piston-cylinder arrangement 19, in front of the lower end of the cap bar 8 located in the groove 7 and retained (in position) by means of the holding ring 12, the gripper head 22 embracing the head portion of the foremost cap which projects from the holding ring 12. Compressed air is then introduced into the housing 21 of the conveying cup 4 by way of the tubing 23 and presses portions of the flexible diaphragm 9 through the annular slot of the gripper head, so that the front cap 6 of the bar 8 is gripped. The conveying cup 4 is then pivoted along the coulisse guide 5 above one of the bottles standing upright on the conveyor belt 2. At the start of this motion, the foremost cap 6 is withdrawn from the cap bar while overcoming the holding resistance of the holding ring 12.

The holding ring 12 then grips the succeeding cap in the bar. The bottle 1 which arrives at the station 10 under the conveying cup 4 actuates the lever 11, whereupon the diaphragm 9 of the cup 4 is relieved from pressure and releases the cap. An applicator 16 arranged beyond the station 10—with respect to the direction of conveying—and actuated, for example, by means of compressed air, presses the caps against the bottles from above. This method permits mounting caps with even a very steep cone cleanly and firmly on the bottles and subsequently fixing them on the bottle without difficulty. The opening and closing motion of the centering clamp is expediently effected by electromagnetic devices which, in turn, are controlled by means of contacts, which are acted on by the moving bottles.

On its way from the cap bar to the bottle, the cap is unable to execute any uncontrolled motion of its own. It thus becomes possible to control the caps located in the cap magazine on rollers by photo-optical scanning so that the emblem or lettering arranged on the jacket of the cap always arrives at the same place, for example, above the label.

What is claimed is:

1. Bottle capping apparatus adapted to operate with a source of caps and comprising a bottle conveyor adapted to convey bottles sequentially to a capping station, a cap conveying cup, a piston and cylinder means adapted to pivot and displace said cup between said source and station; said cup including a housing, a gripper head supported in said housing and provided with slots, a flexible diaphragm covering said slots and means to supply a pressure medium to said housing to force the diaphragm through the slots to retain a cap within said gripper head; means adjacent said capping station to press caps onto their respective bottles, a centering clamp means at said capping station to locate accurately bottles arriving at said station and to guide caps from said head to said bottles, said clamp means including pivotal elements including guide elements and elastic holding elements in said guide elements, said guide and holding elements being respectively adapted to funnel caps from said cup to said bottles and to engage said bottles, sorting means coupled to said clamp means and adapted to feed bottles to said station, and electromagnetic means to operate said clamping means and thereby said sorting means.

2. Bottle capping apparatus adapted to operate with a source of caps and comprising a bottle conveyor adapted to convey bottles sequentially to a capping station, a cap conveying cup, a piston and cylinder means adapted to pivot and displace said cup between said source and station; said cup including a housing, a gripper head supported in said housing and provided with slots, a flexible diaphragm covering said slots and means to supply a pressure medium to said housing to force the diaphragm through the slots to retain a cap within said gripper head; means adjacent said capping station to press caps onto their respective bottles, and centering clamp means at said capping station to locate accurately bottles arriving at said station and to guide caps from said head to said bottles, said clamp means including pivotal elements including guide elements and elastic holding elements in said guide elements, said guide and holding elements being respectively adapted to funnel caps from said cup to said bottles and to engage said bottles.

3. Bottle capping apparatus adapted to operate with a source of caps and comprising a bottle conveyor adapted to convey bottles sequentially to a capping station, a cap conveying cup, a piston and cylinder means adapted to pivot and displace said cup between said source and station; said cup including a housing, a gripper head supported in said housing and provided with slots, flexible diaphragm covering said slots and means to supply a pressure medium to said housing to force the diaphragm through the slots to retain a cap within said gripper head; and means adjacent said capping station to press caps onto their respective bottles.

4. Bottle capping apparatus adapted to operate with a source of caps and comprising a bottle conveyor adapted to convey bottles sequentially to a capping station, a cap conveying cup, and means adapted to displace said cup between said source and station; said cup including a housing, a gripper head supported in said housing and provided with slots, a flexible diaphragm covering said slots and means to supply a pressure medium to said housing to force the diaphragm through the slots to retain a cap within said gripper head.

5. Bottle capping apparatus adapted to operate with a source of caps and comprising a bottle conveyor adapted to convey bottles sequentially to a capping station, a cap conveying cup, a piston and cylinder means adapted to pivot and displace said cup between said source and station; and a centering clamp means at said capping station to locate accurately bottles arriving at said station and to guide caps from said head to said bottles, said clamp means including pivotal elements including guide elements and elastic holding elements in said guide elements, said guide and holding elements being respectively adapted to funnel caps from said cup to said bottles and to engage said bottles.

6. Bottle capping apparatus comprising a bottle conveyor adapted to convey bottles sequentially to a capping station, a source of caps, a cap conveying cup, a piston and cylinder means adapted to pivot and displace said cup between said source and station; said cup including a housing, a gripper head supported in said housing and provided with slots, a flexible diaphragm covering said slots and means to supply a pressure medium to said housing to force the diaphragm through the slots to retain a cap within said gripper head; means adjacent said capping station to press caps onto their respective bottles, a centering clamp means at said capping station to locate accurately bottles arriving at said station and to guide caps from said head to said bottles, said clamp means including pivotal elements including guide elements and elastic holding elements in said guide elements, said guide and holding elements being respectively adapted to funnel caps from said cup to said bottles and to engage said bottles, sorting means coupled to said clamp means and adapted to feed bottles to said station, and electromagnetic means to operate said clamping means and thereby said sorting means; said source of caps comprising a stack of bottle caps each comprising a bottom and a frusto-conical jacket depending from said bottom and having a free edge directed away from said bottom, said jacket and bottom defining a frusto-conical receptacle for the neck of a bottle, said jacket including at least one indentation adjacent said bottom, said indentation extending into said receptacle and including a free edge directed away from said bottom, said indentation defining an opening in the jacket in communication with said receptacle; said caps being in nesting relation with the edges of the indentations resting on the bottoms of the adjacent caps.

7. Apparatus as claimed in claim 6, comprising means to hold the stack of caps frictionally with a holding force which said cup can overcome.

8. A bottle capping machine comprising a cap conveyor cup adapted for applying caps to bottles, a centering clamp adapted for centering the bottles relative to said cup, said cup including a housing, a gripper head in said housing and provided with slits and a flexible membrane on said head covering said slits, and a flexible compressed air conduit coupled to said head to force the membrane through said slits, said centering clamp including complementary guide members, complementary holding elements on said guide members and swinging arms supporting said holding elements and guide members for centering the bottles.

9. A machine according to claim 8, wherein the guide members of the centering clamp are of conical shape and the holding elements are of half-ring shape and include a resilient material for contacting the bottles.

10. A machine according to claim 8, wherein the guide members of the centering clamp are of ribbed shape and the holding elements are of half-ring shape and include a resilient material for contacting the bottles.

11. A machine according to claim 8 comprising an applicator adapted for pressing the caps on the bottles.

References Cited

UNITED STATES PATENTS

| | | | |
|---|---|---|---|
| 2,842,913 | 7/1958 | Marindin | 53—310 X |
| 2,849,847 | 9/1958 | Anderson | 53—310 |
| 2,850,858 | 9/1958 | Daly et al. | 53—306 |
| 2,884,751 | 5/1959 | Bjering | 53—317 |
| 3,212,231 | 10/1965 | Pechmann | 53—307 |
| 2,670,076 | 2/1954 | Monks | 206—65 |

FOREIGN PATENTS 1,084,101   6/1954   France.

TRAVIS S. McGEHEE, *Primary Examiner.*

N. ABRAHAMS, *Assistant Examiner.*

U.S. Cl. XR.

53—307, 367; 29—208; 294—99; 206—65; 220—97; 215—38